United States Patent
Willmann et al.

[11] Patent Number: 5,991,294
[45] Date of Patent: Nov. 23, 1999

[54] METHOD OF ESTABLISHING A MULTICHANNEL CONNECTION, AS WELL AS SWITCHING FACILITIES, COMMUNICATIONS NETWORK, AND TRANSMIT-SIDE AND RECEIVE-SIDE COMMUNICATIONS NETWORK ACCESS FACILITIES

[75] Inventors: Gert Willmann, Stuttgart; Johannes Conradt, Ludwigsburg; Wolfgang Staiger, Wannweil, all of Germany

[73] Assignee: Alcatel Alsthom Compagnie Generale D'Electricite, Paris, France

[21] Appl. No.: 08/764,789

[22] Filed: Dec. 12, 1996

[30] Foreign Application Priority Data

Dec. 16, 1995 [DE] Germany ............... 195 47 109

[51] Int. Cl.[6] ................................................. H04J 3/00
[52] U.S. Cl. .................................................... 370/375
[58] Field of Search ..................... 370/252, 357, 370/360, 369, 370, 375, 376, 380

[56] References Cited

U.S. PATENT DOCUMENTS

| | | | |
|---|---|---|---|
| 4,467,471 | 8/1984 | Troost ........................... | 370/376 |
| 4,991,169 | 2/1991 | Davis et al. ................... | 370/463 |
| 5,136,578 | 8/1992 | Beshai et al. ................. | 370/375 |
| 5,260,932 | 11/1993 | Vinel ............................. | 370/253 |
| 5,278,822 | 1/1994 | Yashiki ......................... | 370/235 |
| 5,363,374 | 11/1994 | Zein Al Abedeen et al. .. | 370/233 |
| 5,668,601 | 9/1997 | Okada et al. ................. | 348/423 |
| 5,671,221 | 9/1997 | Yang ............................ | 370/320 |

FOREIGN PATENT DOCUMENTS

| | | |
|---|---|---|
| 0173274 | 8/1985 | European Pat. Off. . |
| 0227732 | 12/1986 | European Pat. Off. . |
| 0565203 | 4/1993 | European Pat. Off. . |
| 4444153 | 10/1995 | Germany . |

OTHER PUBLICATIONS

"System 12 Digital Switching Network" by J.M. Cotton et al, Electrical Communications, vol. 56, No. 2/3, 1981, pp. 147 to 160.

*Primary Examiner*—Melvin Marcelo
*Assistant Examiner*—Jasper Kwoh
*Attorney, Agent, or Firm*—Ware, Fressola, Van der Sluys & Adolphson LLP

[57] ABSTRACT

The invention concerns a method of establishing a multichannel connection comprising N channels, two switching facilities, a communications network, and a transmit-side and a receive-side access facility to a communications network. When a multichannel connection (SLOT3, SLOT7; SLOT5, SLOT28) is established through a switching network (DSN), first the transit times (T1, T2, T3) of more than N channels through the switching network (DSN) are determined (MONIT). Then N channels are selected from said more than N channels by means of an algorithm (CONTR), which uses the determined transit times (T1, T2, T3) as input values. Subsequently the selected N channels are assigned as channels to the multichannel connection (SLOT3, SLOT7; SLOT5, SLOT28), and for their synchronization the channels are delayed in accordance with the determined transit times (T1, T2, T3). This method is also applicable to end-to-end multichannel connections and single channel connections.

14 Claims, 3 Drawing Sheets

METHOD OF ESTABLISHING A MULTICHANNEL CONNECTION, AS WELL AS SWITCHING FACILITIES, COMMUNICATIONS NETWORK, AND TRANSMIT-SIDE AND RECEIVE-SIDE COMMUNICATIONS NETWORK ACCESS FACILITIES

TECHNICAL FIELD

The invention concerns a method of establishing a multichannel connection comprising N channels, switching facilities for a communications network, a communications network and a transmit-side and a receive-side access facility to a communications network.

BACKGROUND OF THE INVENTION

In contrast to "normal" connections, multichannel connections have very special synchronization requirements. These requirements can be described as follows, for example with the usual time-division multiplex transmission in telephone networks (32 channels, time frames of 125 $\mu$s):

1. The sequence of the channels within the frame must be safeguarded.
2. The channels assigned to a multichannel connection must be time-synchronized with each other, i.e. the PCM (Pulse Code Modulation) words of all channels of the multichannel connections must belong to a single frame of the transmitter as well as of the receiver.

When the second request for synchronization is fulfilled, there are problems because the transit times of different paths through a switching network do not generally coincide. These deviations are the result of transforming channels to the time-stages of the switching network.

The invention now starts with a known solution for the fulfillment of these synchronization requests, as described for example in the European patent EP 85 110 673.2.

The channels of a multichannel connection are conducted like single channels through the switching network of an exchange. A buffer is provided behind the switching network, whereby the channels of the multichannel connection are synchronized. The delay of individual channels required for the synchronization is determined by the transmission of frame numbers in the individual channels.

This solution has the disadvantage that a large output-side buffer could be required under certain circumstances.

Further solutions are known from the American patent U.S. Pat. No. 5,136,578:

A further solution is to synchronize the channels of a multichannel connection during each switching network stage. To that end an additional frame is temporarily stored in each time-stage. This solution has the disadvantage that the transit time through the switching network becomes approximately double.

A further solution includes providing special assignment specifications between the input-side and the output-side channels in each time-stage of a switching network, and in this way possibly avoid a time displacement between different channels being switched through the network. Although this proposed solution reduces the required synchronization buffer, the path selection within the switching element is restricted and special switching elements are required.

SUMMARY OF THE INVENTION

The invention has the task of improving the transit time behavior of a single or a multiple channel connection. The task is fulfilled by a method of establishing a multichannel connection in a communications network consisting of N channels, the method comprising the steps of determining the transit times of more than N channels; selecting N channels from the more than N channels by means of an algorithm using the determined transit times as input values; and assigning the selected N channels as channels (SLOT1, SLOT2) of the multichannel connection.

It is also fulfilled by a switching facility for a communications network, comprising a switching network and a switching-network access unit, the switching-network access unit comprising a device for determining transit times of channels through the switching network, an input device, and a controller, the input device comprising a device for assigning channels of the switching network to a multichannel connection and being designed to cause, in response to a request for an N-channel connection, the device for determining transit times to determine transit times of more than N channels, and the controller being designed to select N channels from the more than N channels by means of an algorithm using the determined transit times as input values, said algorithm causing the input device to assign the selected N channels to the multichannel connection.

It is still further fulfilled by a communications network with a switching facility comprising a switching network and an access unit, the access unit comprising a device for determining transit times of channels through the switching network, an input device, and a controller, the input device comprising a device for assigning channels of the switching network to a multichannel connection and being designed to cause, in response to a request for an N-channel connection, the device for determining transit times to determine transit times of more than N channels, and the controller being designed to select N channels from the more than N channels by means of an algorithm using the determined transit times as input values, said algorithm causing the input device to assign the selected N channels to the multichannel connection.

It is also fulfilled by a transmit-side access facility to a communications network, comprising a device for assigning channels established in the communications network to a multichannel connection, and a controller designed to signal, in response to a request for the establishment of an N-channel connection, the establishment of more than N channels through the communications network to a receive-side access facility and to cause the receive-side access facility to determine the transit times of said more than N channels.

The invention is further fulfilled by a receive-side access facility to a communications network, comprising a device for determining transit times of channels established through the communications network, and a controller designed to detect the establishment of more than N channels of a multichannel connection from a transmit-side access facility, to cause the transit times of said channels to be determined, to select N channels from the more than N channels by means of an algorithm using the determined transit times as input values, and to cause the transmit-side access facility to assign only the selected N channels to the multichannel connection.

It is also fulfilled by a switching facility for a communications network, comprising a switching network and a switching-network access unit, the switching-network access unit comprising a device for determining transit times of channels through the switching network, an input device, and a controller, the input device comprising a device for assigning a channel through the switching network to a single-channel connection and being designed to cause, in response to a request for a single-channel connection, the device for determining transit times to determine transit times of more than one channel, and the controller being designed to select a channel from two or more channels by means of an algorithm using the determined transit times as input values, said algorithm causing the input device to assign the selected channel to the single-channel connection.

The invention is based on the idea that when a multi-channel connection containing N channels is established, to 1) determine the transit times of more than N channels, 2) select N channels from these more than N channels by means of these transit times, and 3) assign said N channels to the multichannel connection. The selection in this case conforms to certain predetermined criteria. For example, the N channels with the shortest transit time or with the smallest transit time difference are selected. The use of these selected channels for the multichannel connection produces a reduction in the total transit time of the multichannel connection, or a reduction in the size of the required synchronization buffer.

It is also possible to convert this basic idea to the establishment of single channel connections, i.e. to determine the transit times of several channels and from these to select the one which best meets the specified criteria. Such criteria are for example selecting the channel with the shortest transit time, or selecting the channel whose transit time is closest to a predetermined transit time. Therefore, what is said in the following with respect to multichannel connections applies analogically to single channel connections.

The invention can be used with all of the above-described solutions, preferably with the first solution. It is furthermore possible to use the invention not only for switching multichannel connections in a switching network, but also for switching all other multichannel connections in communications networks. Such applications are especially the switching of multichannel connections at a higher communications level within a communications network in accordance with the ISO reference model, or the switching of an end-to-end multichannel connection via a communications network.

Further advantages of the invention result from the predetermined selection criteria and particularly comprise a reduction of the required synchronization buffer and a reduction of the total transit time of a multichannel connection. In addition to a reduction in the total transit time average, in this case the invention has above all the advantage that most of the higher quantiles (95%, 99%, . . . ) of the total transit time are reduced. This effect is particularly pronounced in single channel connections.

A further advantageous effect is a more uniform switching network load, thus increasing the permissible load of the switching network.

BRIEF DESCRIPTION OF THE DRAWINGS

The invention will be explained in greater detail in the following by means of three configuration examples with the help of the enclosed drawings, where.

BEST MODE FOR CARRYING OUT THE INVENTION

Figure 1:
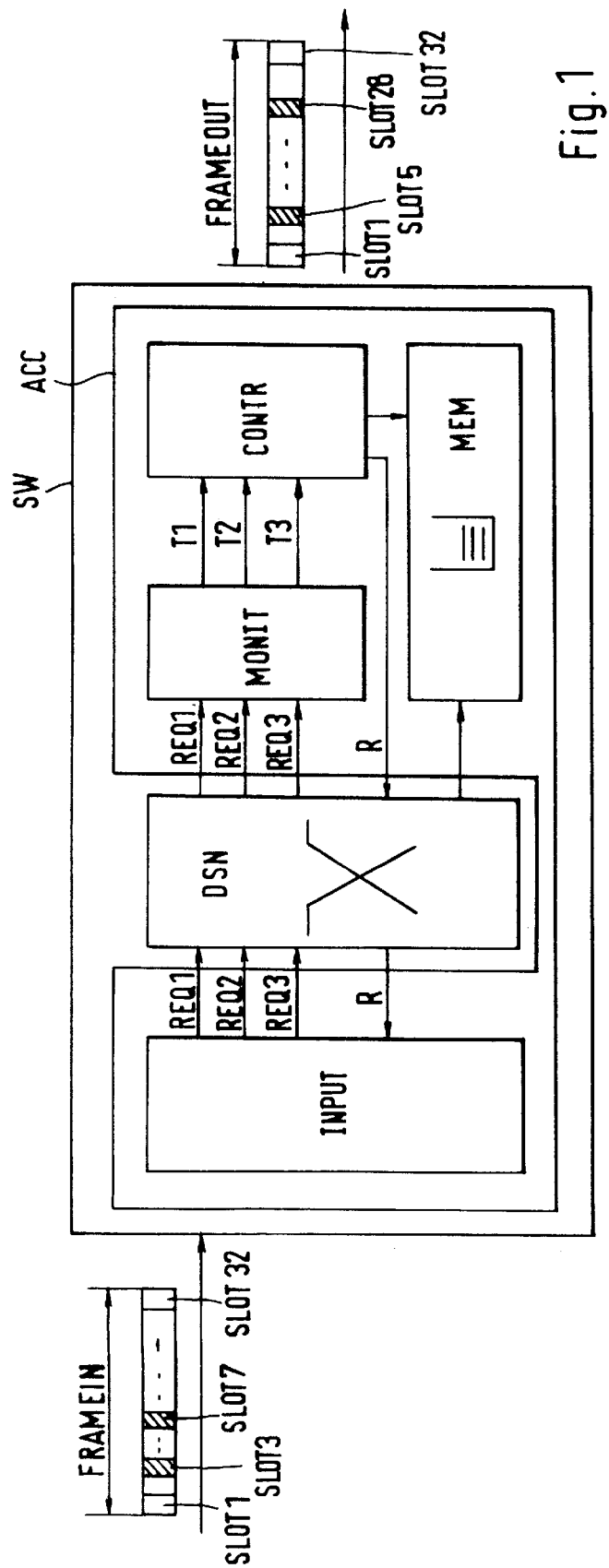
FIG. 1 is a block diagram of a switching facility according to the invention for a first configuration example.

A first configuration example describes performing the method of the invention to establish a multichannel connection in a switching facility according to the invention. FIG. 1 illustrates a switching facility SW with a switching network DSN and an access facility ACC. The switching network DSN is accessed through the access facility ACC.

The switching facility SW makes space and time switching functions available and therefore has a number of PCM input and PCM output lines, each of which has 32 time channels. The structure of such a switching facility and the switching network DSN in particular can be found for example in the article "System 12 Digital Switching Network" by J. M. Cotton et al, Electrical Communications, Volume 56, No. 2/3, 1981. In this case the digital switching network described therein corresponds to the switching network DSN.

However, it is also possible for the switching facility SW to be structured differently, and particularly for example to perform only time-switching functions or to switch a different number of time channels per input or output line. The switching facility SW can be used to exchange speech or data, but it can also be a cross-connect switching facility.

To represent the number of input and output lines, FIG. 1 illustrates a time frame FRAMEIN with 32 time channels SLOT1 to SLOT32, and a time frame FRAMEOUT also with the 32 time channels SLOT1 to SLOT32. Two of each of these channels, channels SLOT3 and SLOT7 or channels SLOT5 and SLOT28, are especially identified. These are channels assigned to a multichannel connection. Said channels are switched by the switching facility SW, where the channels of the multichannel connection need to be delayed by the same amount of time in the switching facility SW, to maintain their synchronism while they are being switched by the switching facility SW.

The switching network DSN is a self-path-finding digital switching network containing several switching network stages as well as space and time stages. In contrast to the representation in FIG. 1, in this case it is also possible for this not to be an extended switching network but a reverse switching network. A possibly more detailed construction of such a switching network can be found in the above-described article for example.

The access facility ACC has an input device INPUT, a controller CONTR, a memory device MEM and a measuring device MONIT.

The input device INPUT is responsible for one or for several input lines. It detects a request arriving through these input lines to the switching facility SW to establish a multichannel connection, and initiates the necessary connection through the switching network DSN. The signalling of such a multichannel connection takes place for example via the number 7 signalling protocol, which specifies three different types of multichannel connections:

H0: 6 channels @ 64 kbits/s

H11: 24 channels @ 64 kbits/s

H12: 30 channels @ 64 kbits/s.

However it is also possible for such a multichannel connection to comprise any number of channels between 2 and 30 in a time frame with 32 channels. For a correspondingly larger number of time channels a multichannel connection can comprise a correspondingly larger number of time channels. The simplest case was chosen for this configuration example, namely a multichannel connection with two time channels.

After it detects the request to establish a multichannel connection comprising the channels SLOT3 and SLOT7, the input device INPUT initiates the establishment of three connections through the switching network DSN by sending three connection requests REQ1 to REQ3 to the switching network DSN.

It is also possible to construct two or more additional channels through the switching network, instead of one additional channel. Among other things, the choice of the number of additional channels depends on the number of channels in the multichannel connection. The general rule is that a multichannel connection with a large number of channels requires more additional channels than one with a smaller number of channels. The largest part of the maximum possible quantitative advantage is already obtained with a small number of additional channels (one to two).

It is furthermore possible for the number of the additional channels to be determined by the input device INPUT as a function of the number of channels of the requested multichannel connection. The number of additional channels can also be determined by means of a control algorithm based on input variables such as the traffic load of the switching facility SW, or the current transit times through the switching network DSN.

From the connection requests REQ1 to REQ3, which were "drilled" by the self-path-finding switching network DSN, i.e. which have constructed a path through the switching network DSN, the measuring device MONIT obtains the time marks designated there by the input device INPUT, and from them determines a respective transit time T1 to T3 for the channels constructed via the connection requests REQ1 to REQ3. In this case the transit times T1 to T3 are either calculated by comparing the time marks with a current time source, or the time marks themselves are used as a measure of the transit time. The thus determined transit times T1 to T3 are then routed to the controller CONTR.

The controller CONTR is responsible for selecting those channels of the switching network DSN via which the multichannel connection is routed. To that end it works with a predetermined algorithm which conforms this selection to certain prespecified criteria. Such a criterion is to keep as short as possible the delay time of the multichannel connection to be established by means of the switching network DSN. In order to implement this criterion, the algorithm compares the transit times T1 to T3 of the three channels being established with each other, and selects the two channels which have the shortest transit times.

Another potential criterion is to minimize the required delay buffer as much as possible. To that end the algorithm compares the transit times T1 to T3 of the three established channels with each other and selects from the three possible combinations of this instance the one with the smallest difference in transit times.

If a multichannel connection includes two or more groups of different channels, for example for a video telephone connection which has a narrow band voice channel and a broad band video channel, the algorithm can be modified as follows to achieve this criterion:

The switching network DSN constructs more broad band channels and also more narrow band channels than necessary. The algorithm tests all possible combinations of narrow band and broad band channels to detect which combination has a longer transit time in the broad band connection than in the narrow band connection. From the combinations with this feature it then selects the one that has the smallest difference in transit times between the broad band and the narrow band channel. This process is based on the idea of delaying as much as possible the narrow band channel because it then requires fewer delay buffers.

A possible further criterion is as small a difference as possible between the transit times of the channels, particularly when the differences between the transit times do not exceed the frame time. This can be advantageous for the subsequent processing of data transmitted via the multichannel connection.

It is also possible for the algorithm to optimize the selection of the channels with respect to several of the above-cited criteria. This is particularly useful with multichannel connections comprising a larger number of individual channels.

If the selection of two channels was made from the established three channels, the controller CONTR sends a message R through the switching network, which cancels the not selected channel. In the end this message is received by the input device INPUT, which then by means of this message assigns the channels in the multichannel connection to the selected channels. The controller CONTR furthermore determines the difference in the transit times of the two selected channels and sends a control signal with this value to the memory device MEM, and an identification of the channel to be delayed.

The memory device MEM contains a buffer memory which is used to delay one or more channels. Thus it comprises a control circuit which detects the necessary memory management functions, and memory circuits which act as the buffer memory by means of hardware. Upon receiving a control signal from the controller CONTR, which contains the channels to be delayed and the corresponding delay time, it arranges respective virtual waiting queues in the buffer memory and thereby delays the indicated channels by the indicated delay time.

The course of the method will now be explained by means of FIG. 2, which represents the sequence in the switching facility SW with respect to time.

Figure 2:
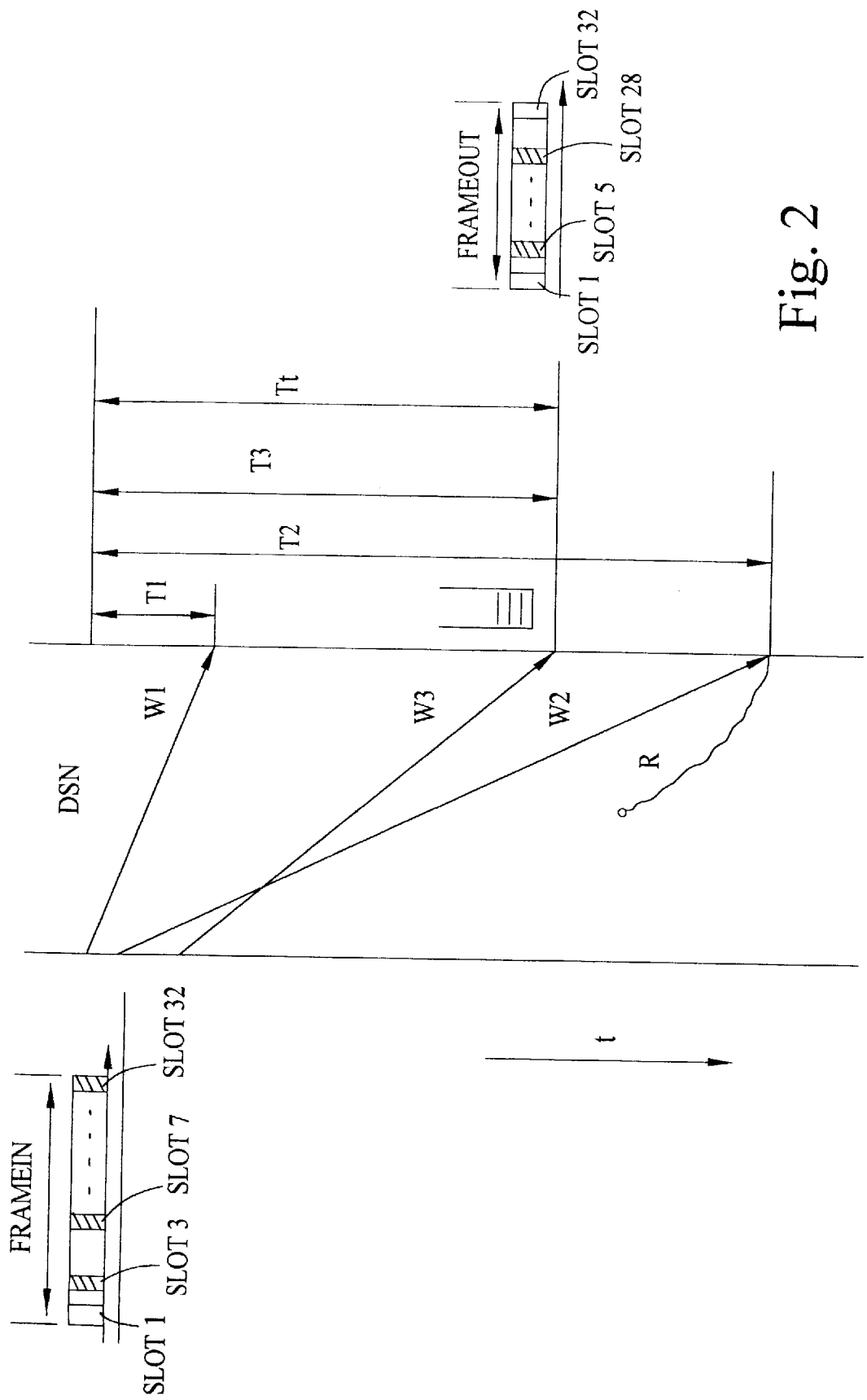
FIG. 2 is a time chart of the establishment of a connection in the switching facility of FIG. 1.

FIG. 2 illustrates the time frames FRAMEIN and FRAMEOUT with the channels SLOT1 to SLOT32, three channels W1 to W3 established by the switching network DSN, and the message R.

By means of the switching network DSN, the input device INPUT establishes the three channels W1 to W3 for the multichannel connection comprising the two channels. In each case these paths contain the transit times T1 to T3 via the switching network DSN. The transit times T1 to T3 are determined by the measuring device MONIT through time stamps and are directed to the controller CONTR. From these three channels, the algorithm implemented in the controller CONTR now selects the two channels with the shortest transit time, i.e. channels W1 and W3. The transmission of the message R by the switching network DSN causes the channel W2 to be cancelled and the input device INPUT to be informed of the selection. The latter then assigns channels W1 and W3 to the channels SLOT1 and SLOT7, thus the channels of the multichannel connection. The controller CONTR further calculates a time difference that corresponds to the difference between the transit time T3 and the transit time T1. This transit time and information regarding the channel W3 to be delayed are then sent by the controller CONTR to the memory device MEM. The latter then causes the path W2 to be delayed by this time difference, so that both channels of the multichannel connection are delayed by an equal time Tt in the switching facility SW (shown in FIG. 1), which causes them to maintain their synchronism. As can be seen from the above description, the method of the invention requires a higher control effort and a higher switching network load during the connection establishment phase. However, the time of the connection establishment phase is shorter by orders of magnitude than the time during which the connection remains subsequently established. Therefore, this short-time higher load of the switching facility SW (shown in FIG. 1) does not carry any weight.

Figure 3:
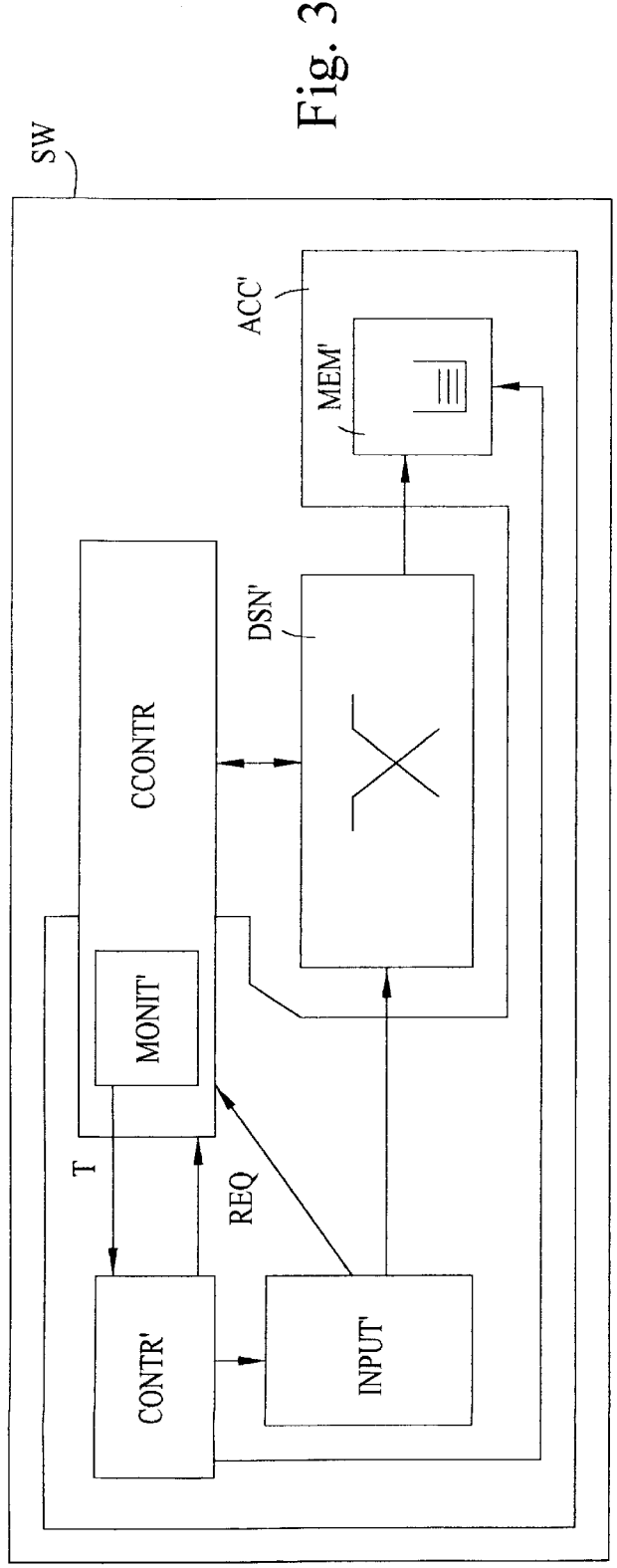
FIG. 3 is a block diagram of a switching facility according to the invention for a second configuration example.

A second configuration example describes the performance of the method of the invention in a switching facility according to the invention, which contains a centrally controlled switching network. FIG. 3 illustrates a switching facility SW' with an access facility ACC', a switching network DSN' and a central controller CCONTR. The switching network DSN' is a centrally controlled switching network, which is controlled by the central controller CCONTR. To establish a path in the switching network DSN', a corresponding request REQ is sent to the central controller CCONTR which determines a possible path through the switching network DSN', and then adjusts the individual switching elements of the switching network DSN' accordingly, so that this path can be established.

The input device INPUT' is constructed like the input device INPUT, with the difference that it does not send the connection requests for the three channels to the switching network DSN', but rather to the central controller CCONTR.

The central controller CCONTR is responsible for establishing the paths in the switching network DSN'. To that end it has the necessary data available describing the condition of the switching network DSN', and by means of these data it determines, upon request, paths for channels through the switching network DSN', whose establishment it then controls by means of special control commands to the switching elements of the switching network DSN'. The central controller CCONTR first simulates the establishment of paths through the switching network DSN' before it causes their establishment, i.e. it calculates the establishment by simulating the switching network DSN' in the central controller CCONTR. In addition, the central controller CCONTR has the measuring device MONIT' available, which determines the transit time T of the channels assigned to said simulated paths before they are established. The measuring device MONIT' then sends the thus determined transit times to the controller CONTR'.

The controller CONTR' receives the determined transit times T of the channels and makes a selection from these channels in accordance with the algorithm described for the controller CONTR in FIG. 1. Subsequently, by sending a corresponding control message to the input device INPUT', it causes said selected channels to be assigned as channels of the multichannel connection, and by sending a corresponding control message to the central controller CCONTR, it causes only those two selected channels to be established. Beyond that, the controller CONTR' causes the memory device MEM' to delay the channels as required for the synchronization, in accordance with the statements regarding FIG. 1.

It is also possible to construct a switching facility with such a centrally controlled switching network mostly as shown in FIG. 1. The only difference with respect to the functioning mode of FIG. 1 would be that the requests for the switching network to establish the three channels are not sent to the switching network, but rather to the central controller CCONTR.

A third configuration example for carrying out the method of the invention of establishing a multichannel connection will now be described by means of a communications arrangement with a transmit-side access facility according to the invention and a receive-side access facility according to the invention.

Figure 4:
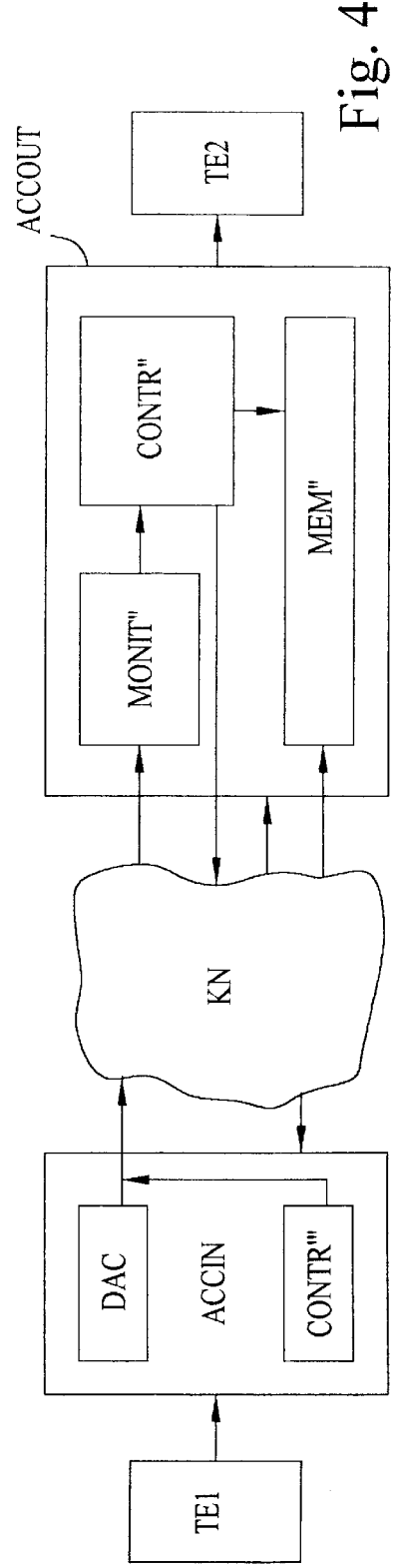
FIG. 4 is a block diagram of a communications arrangement for a third configuration example.

FIG. 4 illustrates two terminals TE1 and TE2, a transmit-side access facility ACCIN, a receive-side access facility ACCOUT and a communications network KN.

The terminals TE1 and TE2 are any type of terminal for communications networks, for example telephone sets, video telephones or computers. It is also possible for the terminals TE1 and TE2 to be access facilities to further communications networks, so that they are routers or bridges for example. The transmit-side access facility ACCIN is constructed analogous to the input device INPUT in FIG. 1. The receive-side access facility ACCOUT contains a measuring device MONIT", a controller CONTR" and a memory device MEM". These devices are constructed analogous to the measuring device MONIT, the controller CONTR and the memory device MEM in FIG. 1.

The communications network KN is any kind of connection-oriented communications network for voice or data. A connection is established via the communications network KN by means of a corresponding signal from the transmit-side access facility ACCIN. The establishment of the connection and the transmission technology on which the user information channel corresponding to this connection is based, is not significant for the invention in this case.

The terminal TE1 signals a request to the transmit-side access facility ACCIN to establish a multichannel connection comprising two channels to the terminal TE2. The transmit-side access facility ACCIN then signals via a controller CONTR" a request to the communications network KN to establish three channels to the receive-side access facility ACCOUT. A time mark is added to the respective request to establish a channel. The three channels are established by the communications network KN and the three connection requests are received by the receive-side access facility ACCOUT. From the time marks entered into these requests, the measuring device MONIT" determines the transit times of the three channels and sends them to the controller CONTR". The latter then selects two of those channels analogously to FIG. 1, adjusts the delay time in the memory device MEM" and sends a corresponding message via the communications network KN to the receive-side access facility, which causes a cancellation of the not selected channel and prompts the receive-side access facility to assign via a device for assigning channels DAC the two selected channels to the multichannel connection.

It is also possible for the transmission of the time mark not to take place with the establishment of the connection, but rather after the connection has been established, the transmit-side access facility sends corresponding time messages to the receive-side access facility via the established channels. The cancellation of the not selected channels is carried out to advantage by the transmit-side access facility ACCIN by means of a corresponding signal to the communications network KN. The message via the selected channels can be sent either through a signalling channel of the communications network KN, or through one of the established user information channels.

What is claimed is:

1. A method of establishing a multichannel connection consisting of N channels (SLOT1, SLOT2), the method comprising the steps of:

determining the transit times (T1, T2, T3) of more than N channels (W1 to W3);

selecting N channels (W1, W3) from the more than N channels (W1 to W3) by means of an algorithm using the determined transit times (T1, T2, T3) as input values; and assigning the selected N channels (W1, W3) as channels (SLOT1, SLOT2) of the multichannel connection.

2. A method as claimed in claim 1, characterized in that, to determine their transit times (T1 to T3), the more than N channels (W1 to W3) are established and channels (W2) not selected are released after the selection.

3. A method as claimed in claim 2, characterized in that the transit times (T1 to T3) are determined by means of the transmission of time messages via the more than N channels (W1 to W3).

4. A method as claimed in claim 1, characterized in that the transit times (T1 to T3) are determined by simulating the establishment of the connection.

5. A method as claimed in claim 1, characterized in that the algorithm selects those N channels between which the least transit time difference is determined.

6. A method as claimed in claim 1, characterized in that the algorithm selects those N channels (W1, W3) for which the shortest transit times (T1, T3) are determined.

7. A method as claimed in claim 1, characterized in that the channels comprising the multichannel connection are selected from two groups, a first group of broad band channels and a second group of narrow band channels, and that the algorithm selects a channel from each group in such a way that the transit time of the channel from the first group is greater than the transit time of the channel of the second group.

8. A switching facility (SW, SW') for a communications network, comprising a switching network (DSN; DSN') and a switching-network access unit (ACC; ACC'), the switchingnetwork access unit (ACC; ACC') comprising a device (MONIT; MONIT') for determining transit times (T1 to T3; T) of channels (W1 to W3) through the switching network (DSN; DSN'), an input device (INPUT, INPUT'), and a controller (CONTR, CONTR'), the input device (INPUT, INPUT') comprising a device for assigning channels (W1 to W3) of the switching network (DSN, DSN') to a multichannel connection and being designed to cause, in response to a request for an N-channel connection, the device (MONIT, MONIT') for determining transit times to determine transit times of more than N channels, and the controller (CONTR, CONTR') being designed to select N channels (W1, W3) from the more than N channels (W1 to W3) by means of an algorithm using the determined transit times (T1 to T3; T) as input values, said algorithm causing the input device (INPUT, INPUT') to assign the selected N channels (W1 to W3) to the multichannel connection.

9. A switching facility (SW) as claimed in claim 8, characterized in that the switching network (DSN) is a self-path-finding switching network and the input device (INPUT) causes the transit times (T1 to T3) of the more than N channels (W1 to W3) to be determined by signalling the establishment of more than N channels to the switching network (DSN).

10. A switching facility (SW) as claimed in claim 8, characterized in that the switching network (DSN') is a centrally controlled switching network with a central controller (CCONTR), and the input device (INPUT') causes the transit times (T1 to T3) of the more than N channels (W1 to W3) to be determined by signalling a request (REQ) of the more than N channels (W1 to W3) to the central controller (CCONTR).

11. A communications network with a switching facility (SW, SW') comprising a switching network (DSN; DSN') and an access unit (ACC, ACC'), the access unit (ACC, ACC') comprising a device (MONIT; MONIT') for determining transit times (T1 to T3; T) of channels (W1 to W3) through the switching network (DSN, DSN'), an input device (INPUT, INPUT'), and a controller (CONTR, CONTR'), the input device (INPUT, INPUT') comprising a device for assigning channels (W1 to W3) of the switching network (DSN, DSN') to a multichannel connection and being designed to cause, in response to a request for an N-channel connection, the device (MONIT, MONIT') for determining transit times to determine transit times of more than N channels, and the controller (CONTR, CONTR') being designed to select N channels (W1, W2) from the more than N channels (W1 to W3) by means of an algorithm using the determined transit times (T1 to T3; T) as input values, said algorithm causing the input device (INPUT, INPUT') to assign the selected N channels (W1, W2) to the multichannel connection.

12. A transmit-side access facility (ACCIN) to a communications network (KN), comprising a device for assigning channels (DAC) established in the communications network (KN) to a multichannel connection, and a controller (CONTR''') designed to signal, in response to a request for the establishment of more than N channels through the communications network (KN) to a receive-side access facility (ACCOUT) and to cause the receive-side access facility (ACCOUT) to determine the transit times of said more than N channels.

13. A receive-side access facility (ACCOUT) to a communications network (KN), comprising a device (MONIT'') for determining transit times of channels established through the communications network (KN), and a controller (CONTR'') designed to detect the establishment of more than N channels of a multichannel connection from a transmit-side access facility (ACCIN), to cause the transit times of said channels to be determined, to select N channels from the more than N channels by means of an algorithm using the determined transit times as input values, and to cause the transmit-side access facility (ACCIN) to assign only the selected N channels to the multichannel connection.

14. A switching facility for a communications network, comprising a switching network and a switching-network access unit, the switching-network access unit comprising a device for determining transit times of channels through the switching network, an input device, and a controller, the input device comprising a device for assigning a channel through the switching network to a single-channel connection and being designed to cause, in response to a request for a single-channel connection, the device for determining transit times to determine transit times of more than one channel, and the controller being designed to select a channel from two or more channels by means of an algorithm using the determined transit times as input values, said algorithm causing the input device to assign the selected channel to the single-channel connection.

* * * * *

UNITED STATES PATENT AND TRADEMARK OFFICE
CERTIFICATE OF CORRECTION

PATENT NO : 5,991,294
DATED : November 23, 1999
INVENTOR(S) : Willmann et al.

It is certified that error appears in the above-identified patent and that said Letters Patent is hereby corrected as shown below:

At column 9, line 34, "switch-ingnetwork" should be

--switching-network--.

Signed and Sealed this

Eighth Day of August, 2000

Attest:

Q. TODD DICKINSON

*Attesting Officer*    *Director of Patents and Trademarks*